(12) United States Patent
Geng et al.

(10) Patent No.: US 12,354,173 B1
(45) Date of Patent: Jul. 8, 2025

(54) DYNAMIC VALUATION SYSTEMS AND METHODS

(71) Applicant: MASSACHUSETTS MUTUAL LIFE INSURANCE COMPANY, Springfield, MA (US)

(72) Inventors: Jia Geng, Springfield, MA (US); Zizhen Wu, Springfield, MA (US); Owen Galvin, Springfield, MA (US); Yi Wang, Springfield, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

(21) Appl. No.: 18/497,910

(22) Filed: Oct. 30, 2023

Related U.S. Application Data

(63) Continuation of application No. 17/064,210, filed on Oct. 6, 2020, now Pat. No. 11,803,917.

(60) Provisional application No. 62/916,125, filed on Oct. 16, 2019.

(51) Int. Cl.
| | |
|---|---|
| *G06Q 40/12* | (2023.01) |
| *G06F 3/04847* | (2022.01) |
| *G06F 16/2457* | (2019.01) |
| *G06N 3/08* | (2023.01) |
| *G06N 7/02* | (2006.01) |
| *G06Q 10/105* | (2023.01) |
| *G06Q 40/06* | (2012.01) |

(Continued)

(52) U.S. Cl.
CPC ......... *G06Q 40/12* (2013.12); *G06F 3/04847* (2013.01); *G06F 16/24578* (2019.01); *G06N 3/08* (2013.01); *G06N 7/02* (2013.01); *G06Q 10/105* (2013.01); *G06Q 40/06* (2013.01); *G06Q 40/02* (2013.01); *G06Q 50/01* (2013.01)

(58) Field of Classification Search
None
See application file for complete search history.

(56) References Cited

U.S. PATENT DOCUMENTS

| | | |
|---|---|---|
| 5,519,773 A | 5/1996 | Dumas et al. |
| 6,334,110 B1 | 12/2001 | Walter et al. |
| 6,389,400 B1 | 5/2002 | Bushey et al. |

(Continued)

FOREIGN PATENT DOCUMENTS

| | | |
|---|---|---|
| EP | 2 109 302 B1 | 10/2009 |
| WO | WO-2009/065052 A1 | 5/2009 |

OTHER PUBLICATIONS

Costa, "Call Flow", https://support.talkdesk.com/hc/en-us/articles/206196766-Call-Flow, Jan. 18, 2018, 1 page.

(Continued)

*Primary Examiner* — Christopher J Fibbi
(74) *Attorney, Agent, or Firm* — Foley & Lardner LLP

(57) ABSTRACT

Disclosed herein a system having an artificial intelligence model, which is executed to generate and display valuation reports on an interactive graphical user interface. The valuation reports include valuation information of companies. The valuation reports include multiple variables associated with the valuation information of the companies whose values are dynamic, and the values may be updated in real-time. The swift turnaround time of the valuation reports on the interactive graphical user interface may allow the client user to trade swiftly and efficiently.

20 Claims, 6 Drawing Sheets

(51) Int. Cl.
G06Q 40/02 (2023.01)
G06Q 50/00 (2012.01)

(56) References Cited

U.S. PATENT DOCUMENTS

| | | | |
|---|---|---|---|
| 6,519,571 B1 | 2/2003 | Guheen et al. | |
| 6,879,683 B1 | 4/2005 | Fain et al. | |
| 6,959,080 B2 | 10/2005 | Dezonno et al. | |
| 7,023,979 B1 | 4/2006 | Wu et al. | |
| 7,035,811 B2 | 4/2006 | Gorenstein | |
| 7,155,401 B1 | 12/2006 | Cragun et al. | |
| 7,184,540 B2 | 2/2007 | Dezonno et al. | |
| 7,539,627 B2 | 5/2009 | Schmidt | |
| 7,599,893 B2 | 10/2009 | Sapir et al. | |
| 8,054,964 B2 | 11/2011 | Flockhart et al. | |
| 8,126,712 B2 | 2/2012 | Mukaigaito et al. | |
| 8,296,160 B1 | 10/2012 | Pletz et al. | |
| 8,341,665 B2 | 12/2012 | Atsmon et al. | |
| 8,355,934 B2 | 1/2013 | Virdhagriswaran | |
| 8,468,081 B2 | 6/2013 | Bonner et al. | |
| 8,666,851 B2 | 3/2014 | Carter | |
| 8,687,776 B1 | 4/2014 | Reynolds et al. | |
| 8,737,595 B2 | 5/2014 | Chishti et al. | |
| 8,799,096 B1 | 8/2014 | Dillon | |
| 8,929,537 B2 | 1/2015 | Chishti et al. | |
| 9,008,283 B2 | 4/2015 | Riahi et al. | |
| 9,020,866 B1 | 4/2015 | Zhou et al. | |
| 9,083,804 B2 | 7/2015 | Conway et al. | |
| 9,208,502 B2 | 12/2015 | Parikh et al. | |
| 9,215,323 B2 | 12/2015 | Chishti | |
| 9,582,786 B2 | 2/2017 | Gubin et al. | |
| 9,779,445 B1 | 10/2017 | Hoberman et al. | |
| 9,911,131 B1 | 3/2018 | Ross et al. | |
| 10,565,602 B1 | 2/2020 | Ross et al. | |
| 11,410,242 B1* | 8/2022 | Lipke | G06N 20/20 |
| 2002/0198882 A1 | 12/2002 | Linden et al. | |
| 2004/0081311 A1 | 4/2004 | Thompson | |
| 2005/0195966 A1 | 9/2005 | Adar et al. | |
| 2006/0062374 A1 | 3/2006 | Gupta | |
| 2007/0094067 A1 | 4/2007 | Kumar et al. | |
| 2007/0136164 A1 | 6/2007 | Roti et al. | |
| 2007/0219867 A1 | 9/2007 | Mehm | |
| 2007/0219885 A1 | 9/2007 | Banasiak et al. | |
| 2008/0184270 A1 | 7/2008 | Cole et al. | |
| 2009/0276368 A1 | 11/2009 | Martin et al. | |
| 2010/0009320 A1 | 1/2010 | Wilkelis | |
| 2010/0020961 A1 | 1/2010 | Spottiswoode | |
| 2010/0049538 A1 | 2/2010 | Frazer et al. | |
| 2010/0114663 A1 | 5/2010 | Casas et al. | |
| 2010/0318451 A1 | 12/2010 | Niccolini et al. | |
| 2010/0332287 A1 | 12/2010 | Gates et al. | |
| 2011/0055098 A1 | 3/2011 | Stewart | |
| 2011/0106735 A1 | 5/2011 | Weston et al. | |
| 2011/0137818 A1 | 6/2011 | Goad et al. | |
| 2012/0036037 A1 | 2/2012 | Xiao et al. | |
| 2012/0078766 A1 | 3/2012 | Rose et al. | |
| 2012/0166445 A1 | 6/2012 | Chakrabarti et al. | |
| 2012/0179598 A1 | 7/2012 | Roth | |
| 2012/0239599 A1 | 9/2012 | Matsumoto | |
| 2012/0278091 A1 | 11/2012 | Yaseen et al. | |
| 2012/0278388 A1 | 11/2012 | Kleinbart et al. | |
| 2013/0080353 A1 | 3/2013 | Kovarsky et al. | |
| 2013/0179259 A1* | 7/2013 | Lindauer | G06Q 30/02 705/14.52 |
| 2014/0012780 A1 | 1/2014 | Sanders | |
| 2014/0156347 A1 | 6/2014 | Agrawal et al. | |
| 2014/0164261 A1 | 6/2014 | Shah et al. | |
| 2014/0236708 A1 | 8/2014 | Wolff et al. | |
| 2014/0249873 A1 | 9/2014 | Stephan et al. | |
| 2014/0254790 A1 | 9/2014 | Shaffer et al. | |
| 2014/0314225 A1 | 10/2014 | Riahi et al. | |
| 2015/0032602 A1 | 1/2015 | Blackhurst et al. | |
| 2015/0106091 A1 | 4/2015 | Wetjen et al. | |
| 2015/0134325 A1 | 5/2015 | Skiba et al. | |
| 2015/0139416 A1 | 5/2015 | Skiba et al. | |
| 2015/0195406 A1 | 7/2015 | Dwyer et al. | |
| 2015/0371277 A1* | 12/2015 | Filiz | G06Q 30/0269 705/14.66 |
| 2016/0071117 A1 | 3/2016 | Duncan | |
| 2016/0110812 A1* | 4/2016 | Mun | G06Q 40/06 705/36 R |
| 2017/0032386 A1 | 2/2017 | Borza | |
| 2017/0124581 A1 | 5/2017 | Wilson et al. | |
| 2018/0129365 A1* | 5/2018 | Dayan | G06F 16/248 |
| 2019/0385213 A1 | 12/2019 | Pande et al. | |
| 2020/0167869 A1* | 5/2020 | Magdelinic | G06F 18/214 |
| 2020/0202436 A1* | 6/2020 | Krishnan | G06N 3/045 |
| 2020/0320758 A1 | 10/2020 | Brogger | |
| 2021/0312541 A1* | 10/2021 | Worthington | G06F 18/21342 |

OTHER PUBLICATIONS

Florez-Lopez et al., "Marketing Segmentation Through Machine Learning Models", An Approach Based on Customer Relationship Management and Customer Profitability Accounting, Social Science Computer Review OnlineFirst, published on Aug. 8, 2008 as doi: 10.1177/0894439308321592, vol. XX, No. X.

Gayle, Sanford, "The Marriage of Market Basket Analysis to Predictive Modeling", 2000, pp. 1-6, retrieved from URL: http://ai.stanford.edu/~ronnyk/WEBKDD2000/papers/gayle.pdf (6 pages).

http://ieeexplore.ieee.org/abstract/document/6599389/Gianmario Motta et al., Forecasting in multi-skill call centers, 2013 Fifth International Conference on Service Science and Innovation (ICSSI), Oct. 24, 2013; 7 pages.

http://www.computer.org/csdl/proceedings/hicss/2001/0981/07/09817023.pdf, Dawn Jutla, Enabling and Measuring Electronic Customer Relationship Management Readiness, Proceedings of the 34th Hawaii International Conference on System Sciences—2001, Aug. 7, 2002, 10 pages.

http://www.genesys.com/solutions/customer-engagement/inbound/intelligent-voice-response Paula Bernier, Genesys Interactive Voice Response; copyright 2017, 3 pages.

http://www.genesys.com/solutions/employee-engagement/workforce-optimization/workforce-planning/speech-text-analytics, Paula Bernier, Genesys Speech & Text Analytics, copyright 2017; 4 pages.

https://pdfs.semanticscholar.org/3803/10409dd7822c6007d5c76808b8c28698e2cd.pdf W.F. Cody et al., The integration of business intelligence and knowledge management, IBM Systems Journal, vol. 41, No. 4, 2002, 17 pages.

https://www.researchgate.net/publication/282976793_Automatic_Summarization_of_Call-center_Conversations, Evgeny Stepanov <https://www.researchgate.net/profile/Evgeny_Stepanov> et al., Automatic Summarization of Call-center Conversations, Conference: IEEE Automatic Speech Recognition and Understanding Workshop (ASRU 2015); Dec. 2015, 3 pages.

https://www.unc.edu/~haipeng/publication/poissonSVD.pdf, Haipeng Shen et al., Forecasting Time Series of Inhomogenous Poisson Processes with Application to Call Center Workforce Management, The Annals of Applied Statistics, Jul. 25, 2008, 25 pages.

Kim et al., "Customer Targeting: A Neural Network Approach Guided by Genetic Algorithms", Management Science, vol. 51, No. 2, Feb. 2005, pp. 264-276.

* cited by examiner

200

| CB Filter & User Profile | User Feedback | Competitor Search | Compare Company & Upload Excel From Email | RSS News Feed | Targeted Investors |
|---|---|---|---|---|---|

Targeted Investor Investment History

Select Target Investor

Select Investment Type         Sort Table         Select Company Status

---all type---         Last Funding         ---all type---         View

Complete Investment History

Show 100 entries         Search

| # | Company Name | Founded On | Country Code | Short Description | Funding Rounds | Status | Last Funding |
|---|---|---|---|---|---|---|---|
| # | [ABC___] | 2017-07-01 | USA | Insurance companies accurately identify used cars. | 3 rounds / $900,000 | Operating | *Announce Date:* 2019-07-15; *Funding Type:* Seed; *Funding Raised:* $825,000. |
| # | [XYZ___] | 2018-08-01 | GBR | Your legal command center execute agreements, manage your shareholders, and make more informed decisions, all from a single platform. | 1 rounds / $2,000,000 | Operating | *Announce Date:* 2019-07-09; *Funding Type:* Seed; *Funding Raised:* $2,000,000. |

| | Company Name | Founded On | Country Code | Short Description | Funding Rounds | Last Funding |
|---|---|---|---|---|---|---|
| [ ] | [_ABC_] | 2018-01-01 | USA | Privacy Management | 1 rounds / $200,000,000 | *Announce Date*: 2019-07-11; *Funding Type*: venture; Series A; $200,000,000; Post Money valuation: $1,300,000,000 |

Email/ Phone [ ] / [ ]
Region / City Unknown / Alberta
Facebook [ ]
Description [ ]
Funding [ ]
1. Announce Date: 2017-07-11; Funding Type: venture Series A; Funding Raised: $200,000,000; Post Money [ ]; $1,300,000,000.
Investors
Founder / CEO No Officer known Founded Company

| [ 2 ] | [_DEF_] | 2018-01-01 | USA | Simplify compliance with State and Federal Data Breach Regulations | 2 rounds / $[6,200,000] | *Announce Date*: 2018-11-12; *Funding Type*: [ ]; Series: [ ]; *Funding Raised*: [ ] Unknown. |
| [ 3 ] | [_XYZ_] | 2018-01-01 | USA | Organizational platform for developing and deploying of strategic marketing | 1 rounds / $[8,000,000] | *Announce Date*: 2017-04-13; *Funding Type*: venture; Series: A; *Funding Raised*: [$8,000,000] |

FIG. 2D

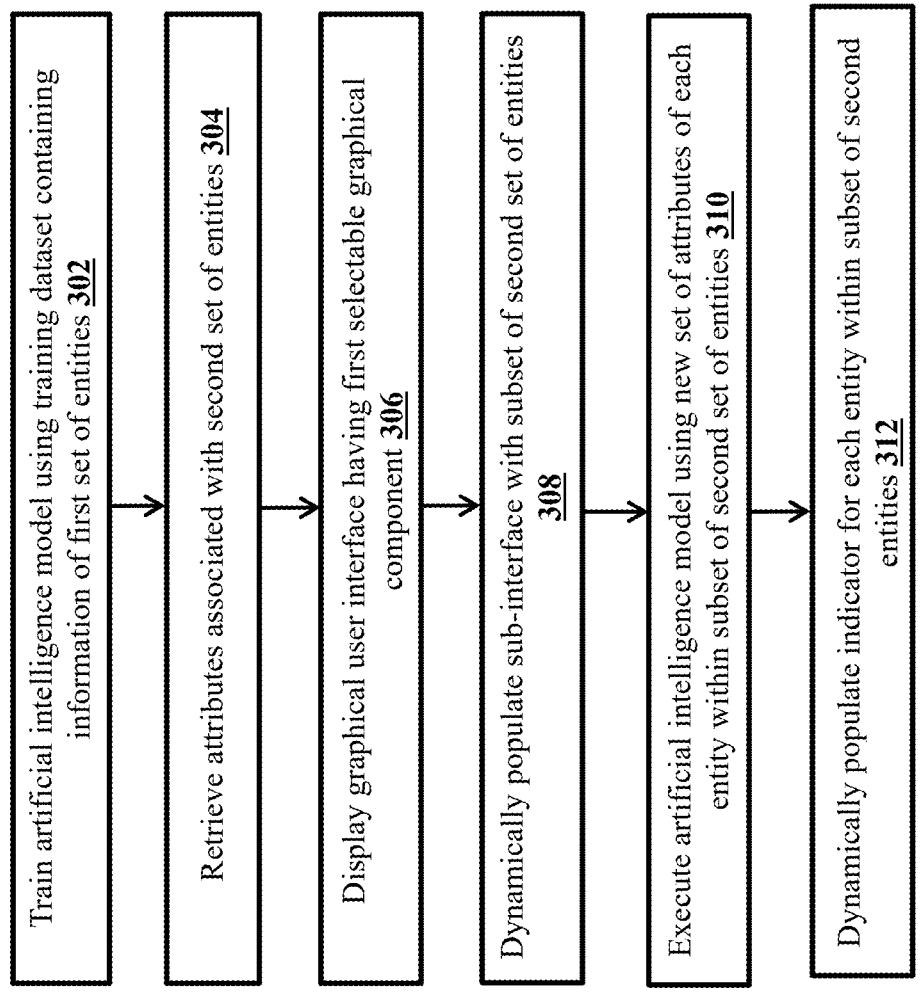

DYNAMIC VALUATION SYSTEMS AND METHODS

CROSS REFERENCE TO RELATED APPLICATIONS

This application claims priority to U.S. Provisional Application No. 62/916,125, filed Oct. 16, 2019, which is incorporated by reference in its entirety.

TECHNICAL FIELD

The subject matter described herein relates generally to data processing models.

BACKGROUND

As processing power of computers have increased and as Internet technology era allows for greater computer functionality and efficient computing systems interconnectivity, many financial institutions utilize conventional valuation computing systems as valuation platforms. Nearly all financial institutions use the conventional valuation computing systems for monitoring and evaluating financial data and other data associated with various early stage companies. In today's world, non-computer implemented valuation platforms have been rendered obsolete because the use of computer-implemented valuation methods provides fast, accurate, and efficient results, which are better aligned with client expectations.

The conventional valuation computing systems may monitor and record this data, then perform data analysis, such as an overall valuation. However, there are numerous technical shortcomings associated with the computer-based tools and the conventional valuation computing systems have created a new set of challenges.

First, the conventional valuation computing systems may usually receive a very large volume of data from multiple data sources. This data may include multiple categories of information, such as total sales, total revenue, employee numbers, profits, and the like. But the data is often fragmented and may be in incompatible data formats. Consequently, stakeholders (e.g., valuation analysts) of the financial institutions operating these valuation systems do not have proper access to uniform datasets for performing the valuation.

Second, the conventional valuation computing systems may process large volumes of data by executing various queries to identify insights, such as valuation. These valuation systems may use generic graphical user interfaces to visualize these insights. The insights may be displayed in a form on the generic graphical user interface, but the existing presentation is not easily understood.

SUMMARY

For the aforementioned reasons, there is a need to develop an intelligent valuation data reporting system, which may overcome the above-mentioned problems of conventional valuation computing systems. The valuation data reporting system may include data structures, which may be used to store, manage, and retrieve data records associated with startup companies more efficiently. The data records may include one or more types of data associated with the startup companies. There is also a need to visualize valuation analysis associated with large volumes of the data records using a systematic and consistent approach. For instance, there is a need to visualize the data records and insights, such as valuation information associated with the startup companies determined based on the data records on a specialized and interactive graphical user interface, which may enable dynamic and real-time update of various sub-interfaces using customized values of the data records.

The valuation data reporting system may include an artificial intelligence model that may be executed to efficiently generate and display dynamic valuation reports on a specially designed interactive graphical user interface. The dynamic valuation reports may include the valuation information of the startup companies. The valuation data reporting system may further include a database, which may be configured to store a training dataset containing various data records associated with various companies in accordance with various attributes in a structured arrangement. The artificial intelligence model may be trained using the training dataset. The use of the artificial intelligence model may improve overall functioning and performance of the valuation data reporting system by significantly reducing a time to generate the dynamic valuation reports in response to an electronic request received from a client user. The dynamic valuation reports may include multiple variables associated with the valuation information of the startup companies whose values may be dynamic, and such values may be updated in real-time. The swift turnaround time of the dynamic valuation reports on the specially designed interactive graphical user interface may allow the client user to trade swiftly and efficiently.

In one embodiment, a server-implemented method comprises retrieving, by a server, attributes associated with a set of entities; and displaying, by the server, a graphical user interface having a first selectable graphical component corresponding a minimum threshold value and a maximum threshold value of a first attribute and a second selectable graphical component corresponding to a second attribute threshold, in response to a user interacting with the first and the second selectable graphical components: dynamically populating, by the server, a sub-interface with a subset of the set of entities having the first attribute within the minimum attribute value and the maximum threshold value and satisfying the second attribute threshold, iteratively executing, by the server, an artificial intelligence model using attributes of each entity within the subset of the set of entities to calculate a value of each entity within the subset of the set of entities; and dynamically populating, by the server, an indicator for each entity within the subset of the set of entities to update the sub-interface.

In another embodiment, a system comprises a server comprising a processor and a non-transitory computer-readable medium containing instructions that when executed by the processor causes the processor to perform operations comprising retrieve attributes associated with a set of entities; and display a graphical user interface having a first selectable graphical component corresponding a minimum threshold value and a maximum threshold value of a first attribute and a second selectable graphical component corresponding to a second attribute threshold, in response to a user interacting with the first and the second selectable graphical components dynamically populate a sub-interface with a subset of the set of entities having the first attribute within the minimum attribute value and the maximum threshold value and satisfying the second attribute threshold, iteratively execute an artificial intelligence model using attributes of each entity within the subset of the set of entities to calculate a value of each entity within the subset of the set of entities; and dynamically populate an indicator for each entity within the subset of the set of entities to update the sub-interface.

It is to be understood that both the foregoing general description and the following detailed description are exemplary and explanatory and are intended to provide further explanation of the subject matter as claimed.

BRIEF DESCRIPTION OF THE DRAWINGS

The accompanying drawings constitute a part of this specification and illustrate embodiments that, together with the specification, explain the subject matter.

FIG. 2C shows an interactive graphical user interface of a valuation software application running on a user computing device, according to an embodiment.

FIG. 2D shows an interactive graphical user interface of a valuation software application running on a user computing device, according to an embodiment.

FIG. 3 shows a method for generating and displaying a dynamic valuation report on an interactive graphical user interface, according to an embodiment.

DETAILED DESCRIPTION

Figure 1:
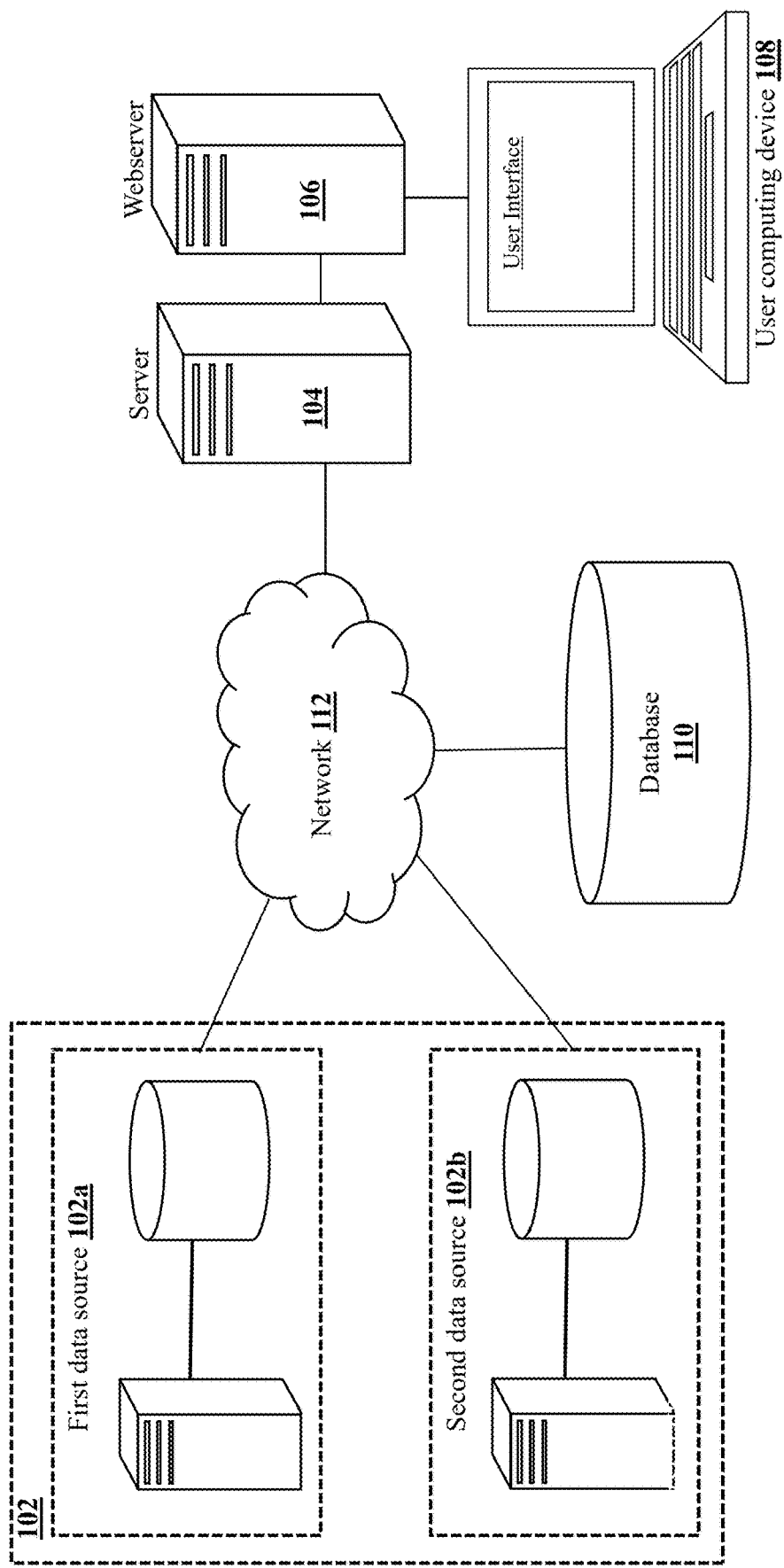
FIG. 1 shows various components of a system to generate and display dynamic valuation reports on an interactive graphical user interface, according to an embodiment.
Figure 2A:
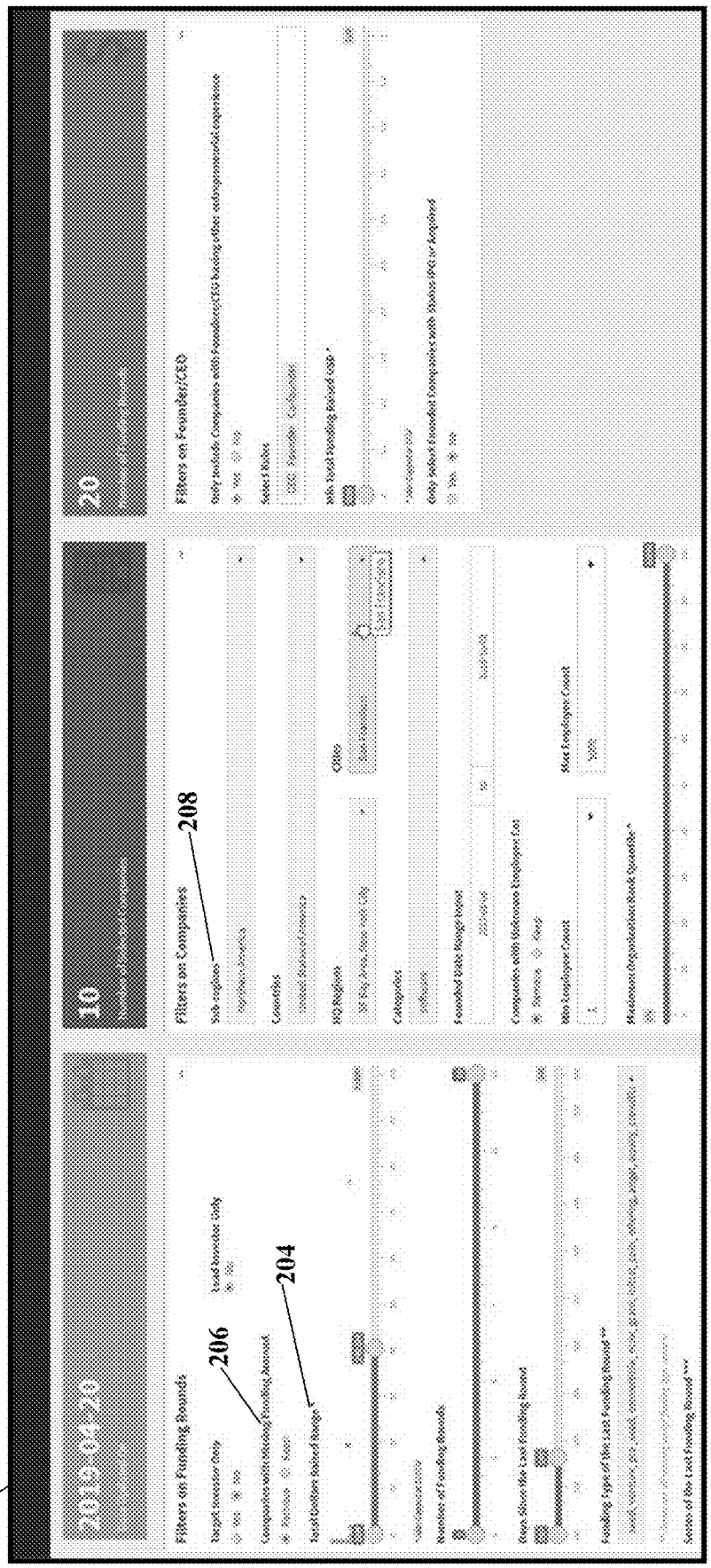
FIG. 2A shows an interactive graphical user interface of a valuation software application running on a user computing device, according to an embodiment.
Figure 2B:
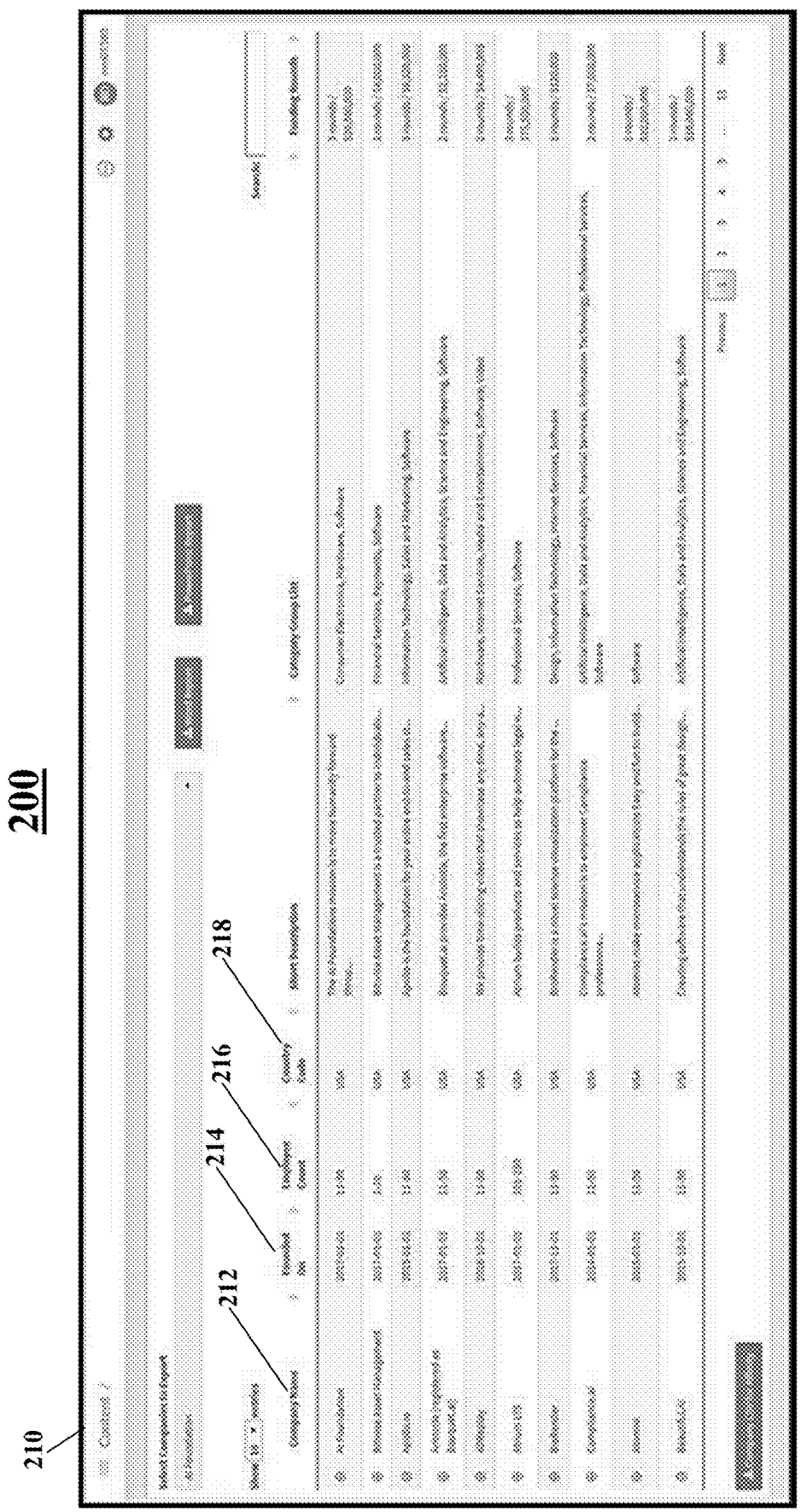
FIG. 2B shows an interactive graphical user interface of a valuation software application running on a user computing device, according to an embodiment.

The subject matter described herein may provide a valuation data reporting system. The valuation data reporting system may deliver valuation information associated with companies or entities to a computing user device. The valuation data reporting system may enable execution of one or more data reporting tools, such as a valuation software application on the user computing device to deliver the valuation information. The valuation information may include valuation scores of the companies, such as startup firms. The valuation software application may offer multiple analytic features, which may be used by the user while evaluating the valuation information associated with the companies on the user computing device. The analytic features may be available by a type of the company over different time periods (for example, monthly, quarterly, etc.) and comparable periods (for example, month over month, quarter over quarter, or year over year).

Various hardware components and software algorithms of the valuation data reporting system, which may be associated with the valuation software application may uninterruptedly and periodically collect data records associated with the companies from multiple data sources. The data records may be consolidated in accordance with various attributes associated with the data records and stored in a database. An artificial intelligence model may be executed to process and analyze the data records. One or more dynamic valuation reports may be generated based on the processed and analyzed data records. The valuation software application running on the user computing device may provide the user with the dynamic valuation reports. The dynamic valuation reports may include the valuation reports of the companies. The valuation report of the company may at least include a value of the company.

The valuation software application may generate a specialized interactive user interface on the user computing device. The interactive user interface may graphically present variables within the dynamic valuation reports in an easy-to-digest form for the user. A dynamic display of the variables may allow the user to view real-time value of each variable within the dynamic valuation reports in an efficient manner consistent with demands of a valuation industry to provide competent services to clients. The valuation software application may allow the user to analyze and customize the dynamic valuation reports using the multiple analytic features in order to assess individual startup companies.

Reference will now be made to the embodiments in the drawings, and specific language will be used here to describe the same. It will nevertheless be understood that no limitation of the scope of the claims or this disclosure is thereby intended. Alterations and further modifications of the features explained herein, and additional applications of the principles of the subject matter explained herein, which would occur to one skilled in the relevant art and having possession of this disclosure, are to be considered within the scope of the subject matter disclosed herein. The present disclosure is here described in detail with reference to embodiments explained in the drawings, which form a part here. Other embodiments may be used and/or other changes may be made without departing from the spirit or scope of the present disclosure. The embodiments described in the detailed description are not meant to be limiting of the subject matter presented here.

FIG. 1 shows various components of a system 100. The system 100 may be a valuation data reporting system employed by a financial institution. The system 100 may include a first data source 102a and a second data source 102b. Hereinafter, the first data source 102a and the second data source 102b may be collectively referred to as data sources 102. The system 100 may further include a server 104, a webserver 106, a user computing device 108, and a database 110.

The data sources 102, the server 104, the webserver 106, the user computing device 108, and the database 110 communicate with each other over a network 112. The network 112 may include, but is not limited to, private or public local area network, wireless local area network, metropolitan area network, wide-area network, and the Internet. The network 112 may further include both wired and wireless communications according to one or more standards via one or more transport mediums. The communication over the network 112 is in accordance with various communication protocols such as transmission control protocol and internet protocol, user datagram protocol, and institute of electrical and electronics engineers communication protocols. The network 112 may further include wireless communications according to Bluetooth specification sets, or another standard or proprietary wireless communication protocol. The network 112 may further include communications over a cellular network, including, for example, a global system for mobile communications, code division multiple access, and enhanced data for global evolution network.

The system 100 may operate in a local computing environment where the user computing device 108 may execute a valuation software application to generate a request. The user computing device 108 may transmit the request to the server 104 via the valuation software application. The request may be to generate one or more valuation reports. Each valuation report may include a value of a company (for example, a startup firm or a startup entity). The data sources 102 and application programs associated with the server 104 and the valuation software application may be stored and executed on local computing resources. The server 104 may locally query the database 110 to retrieve data records associated with the request. The data records may be related to the company mentioned within the request. The database 110 may store the data records, which are organized, summarized, consolidated, categorized, and synthesized according to multiple characteristics to reflect the multi-characteristic nature of the data records. The server 104 may execute an artificial intelligent model using retrieved data records from the database 110 as inputs to generate the valuation reports. The server 104 may present the valuation reports on an interactive graphical user interface of the user computing device 108. Each valuation report may be dynamic such that a value of each variable within the valuation report may be updated in real-time in accordance to any changes in the data records associated with the request.

The system 100 may operate in a cloud-computing environment where the user computing device 108 may be cloud-optimized. The user computing device 108 data may execute the valuation software application. The valuation software application and the user computing device 108 data and application programs may be stored and executed on a remote cloud-based server 104 accessed over a network cloud. In the cloud-computing environment, a web browser on the user computing device 108 may interface with an application program corresponding to the valuation software application, which is executed on the remote cloud-based server 104. Utilizing the web browser executing on the user computing device 108, a user may generate the request. The request may be to generate the one or more valuation reports. Each valuation report may include the value of the company. The user computing device 108 may transmit the request to the remote cloud-based server 104 via the application program. The remote cloud-based server 104 may query the database 110 to retrieve the data records associated with the request. The data records may be related to the company mentioned within the request. The database 110 may store the data records, which are organized, summarized, consolidated, categorized, and synthesized according to the multiple characteristics to reflect the multi-characteristic nature of the data records. The remote cloud-based server 104 may execute the artificial intelligent model using the retrieved data records from the database 110 as inputs to generate the valuation reports. The remote cloud-based server 104 may present the valuation reports on the interactive graphical user interface of the user computing device 108. Each valuation report may be dynamic such that the value of each variable within the valuation report may be updated in the real-time in accordance to any changes in the data records associated with the request.

In operation, a user operating the user computing device 108 may install a valuation software application on the user computing device 108. The valuation software application may implement interactive user interfaces, which may include controls operable by the user to interact with multiple features of the valuation software application. The controls may include buttons, menus, pull-down menus, dialog boxes, scroll bars, and other controls, which may enable the user to view the valuation software application data, invoke the valuation software application functionality, and interact with the valuation software application. A visual representation of the valuation software application may be generated by rendering the user interface state of the valuation software application in a program, for example, a web browser running on the user computing device 108.

The user may use the valuation software application to generate a request or a query to receive a value of a company. In response, the valuation software application may parse the request and notify the server 104 to derive various forms of analytical information from data records associated with request. The data records may be associated with the company. The analytical information may include valuation information associated with the company. The server 104 may be prevented from accessing raw data records from the data sources 102. The server 104 may be limited to access organized data records associated with the request from the database 110. The organized data records may be processed and consolidated form of the raw data records.

The server 104 may be capable of executing various valuation techniques via one or more artificial intelligence models. The one or more artificial intelligence models may be implemented to perform analytics on the data records associated with the request in accordance with the instructions from the server 104 or indirectly from the user computing device 108. The one or more artificial intelligence models may transmit analyzed data records to the server 104. The analyzed data records may include the valuation information associated with the company. The server 104 may generate a valuation report using the analyzed data records. The valuation report may include the value of the company. The server 104 may present the valuation report on an interactive graphical user interface of the user computing device 108 via the valuation software application. The user may use an input device associated with the user computing device 108 to interact with information and graphical components of the valuation report. Values of various variables within the valuation report may be updated in real-time in response to change in corresponding data records associated with the request in the data sources 102.

Data sources 102 may include a first data source 102a and a second data source 102b. The first data source 102a may be a revenue data source providing revenue information of companies. The second data source 102b may be an employee data source providing staffing information of companies. The data sources 102 may include information and data records derived from external sources, such as consulting companies, banks, stock markets, World Wide Web, social media networks, third-party data providers, and any suitable external source required for the proper functioning of the system 100.

The external sources may continuously feed new information into the first data source 102a and the second data source 102b as the new information is available. The external sources may periodically feed the new information into the first data source 102a and the second data source 102b. The external sources may feed the new information into the first data source 102a and the second data source 102b only in response to any update in the information within the external sources.

The data sources 102 may include machine-readable computer files, which may provide the server 104 with the data records in a number of data formats and data types. For example, a particular source may be a transaction application server, which may generate transaction records (e.g., inbound records) according to a particular data model. The particular source may transmit the inbound data records to the server 104 over a number of internal and external data networks 112. As another example, another source may include a data repository storing the data records according to a number of data formats (e.g., XML, JSON, RSS, SQL, text file, and/or RSS) and/or data models (e.g., customized models). The data records may be transmitted to the server 104 or may be fetched by the server 104 based on a triggering condition (e.g., time-based periodic updates, real-time updates).

The data sources 102 may be associated with various institutes, such as a stockbroker company, a public stock exchange, or a bank. Additionally or alternatively, in some cases, the data sources 102 may be associated with an end-user device. The end-user device may generate and transmit the data records to the server 104. For example, in some instances, the data sources 102 may be associated with an electronic blog published on the end-user device. The electronic blog may present financial data records associated with financial activity of the companies. The financial data records may be collected from the end-user device and transmitted to the server 104.

The data sources 102 may be associated with multiple financial application servers. The financial application servers may execute various financial applications, which may generate electronic financial data records. Each electronic financial data record may be associated with a prescribed data model, which is further associated with a particular financial application. The data sources 102 may include a data repository containing the financial data records stored in an electronic format on one or more financial application servers, or other non-transitory machine-readable storage media. For example, each data source 102 may include a data server (for instance, a financial application server) and a source database (for instance, a data repository). The data server and the source database may communicate with each other over the network 112. The data server and the source database may communicate the data records to the server 104 over the network 112. The server 104 may process the data records and store the data records in the database 110.

The data sources 102 may continuously or periodically transmit all the data records to various tables of the database 110 via the server 104 in a number of ways. Each table may store a unique type of data record. For example, in some cases, the server 104 may configure a data repository of the data source 102 in accordance with one or more rules to periodically (e.g., daily) transmit the data records to a corresponding table of the database 110, via a data transfer protocol. The server 104 may generate the one or more rules and store the one or more rules in a local memory.

A server 104 is a computing device. The server 104 may include a processing unit, and a non-transitory machine-readable storage medium. The processing unit may include a processor with a computer-readable medium, such as a random access memory coupled to the processor. The server 104 may be executing algorithms or computer executable program instructions, which may be executed by a single processor or multiple processors in a distributed configuration. The server 104 may be configured to interact with one or more software modules of a same or a different type operating within the system 100.

Non-limiting examples of the processor may include a microprocessor, an application specific integrated circuit, and a field programmable object array, among others. The server 104 is capable of executing data processing tasks, data analysis tasks, and valuation tasks. Non-limiting examples of the server 104 may include a desktop computer, a server computer, a laptop computer, a tablet computer, and the like. For ease of explanation, the FIG. 1 shows a single server computing device functioning as the server 104. However, some embodiments may include a plurality of server computing devices capable of performing various tasks described herein.

The server 104 may be coupled to the data sources 102, the webserver 106, the database 110, and the user computing device 108 via the one or more internal or external networks 12. When a web connection is established, the server 104 is able to receive raw data records from the data sources 102 and any information from the user computing device 108. At the same time, the server 104 is able to transmit processed and structured data records to various tables of the database 110 and any information to the user computing device 108.

The server 104 may retrieve the raw data records from various types of data sources 102. In some cases, the server 104 may receive the raw data records from various types of data sources 102. For instance, the server 104 may execute one or more software modules (e.g., APIs, web hooks, and web sprockets) to consume (e.g., retrieve/pull, receive) or parse the raw data records from the data sources 102. The software modules may be configured to receive or pull the raw data records from particular data sources 102 as required by the particular data source 102. In some cases, a data source 102 may be configured to transmit a set of raw data records to the server 104 at a regular interval using a data transfer protocol.

The server 104 may generate a notification upon receiving the raw data records from the data sources 102. The server 104 may transmit the notification to a processor associated with the database 110. The notification may include an electronic message containing information associated with a date and a time of receipt of the raw data records. The electronic message may further include information associated with a number and a type of the raw data records. The server 104 may store the notifications in a local memory. The local memory may be a part of the server 104.

The server 104 may process the raw data records. The server 104 may execute one or more processing algorithms on portions or all of the raw data records to format and clean the data records. The processing algorithms may be computer files stored on the local memory associated with the server 104. Upon execution of the processing algorithms, the server 104 may identify data field entries in the data records, which are incomplete, missing, or not required. The server 104 may remove the data records, which have missing or incomplete data fields. The server 104 may also apply one or more rules to the data records to identify a sub-group of data records having a common feature (e.g., data records that are associated with a same company). The server 104 may aggregate the data records having the common features.

The server 104 may reconstruct processed data records into a common data model format. The server 104 may execute a standardization algorithm on the processed data records to convert all different formats into a single common format. For example, a first data record may include currency information referred by U.S. dollars and a second data record may include currency information referred by Canadian dollars. On application of the standardization algorithm, the currency information in all the processed data records may be converted into U.S. dollars.

The server 104 may identify multiple data fields within standardized data records. The various data fields may contain information associated with sources of the data records and feature of the data records. Non-limiting examples of the sources of the data records may include websites, external databases, and government agencies. Non-limiting examples of the features of the data records may include information associated with a type of the data record, a category of the data record, and a name of company associated with the data record. The server 104 may compare certain fields of two or more inbound standardized data records being transmitted from disparate data sources 102 to determine whether the two or more inbound data records are related to the same feature and/or the same source. The server 104 may group the data records that have the same feature or the same source or both. The server 104 may store each group of data records in the local memory.

The server 104 may associate each unique set of data records to a corresponding table in the database 110 based on the data fields in the set of data records. Each table in the database 110 may be configured to store a specific set of organized data records. The server 104 may transmit each unique set of data records into the corresponding table in the database 110. For example, a first table in the database 110 may store the data records, which are associated with a first company and a second table in the database 110 may store the data records, which are associated with a second company. In one non-limiting example case, a first data record may be associated with a first company. The first data record may be employee hiring history of the first company. A second data record may be associated with a second company. The second data record may be sales record of the second company. A third data record may be associated with the second company. The third data record may be employee hiring history of the second company. The server 104 may process information associated with the first data record, the second data record, and the third data record. The server 104 may transmit the first data record into the first table. The server 104 may transmit the second data record and the third data record into the second table.

The server 104 may generate and execute mapping algorithms, which may enable automatic mapping of any new data records in the data sources 102 into corresponding tables in the database 110. The mapping algorithms may associate features associated with the data records in the data sources 102 and the tables in the database 110. When the data sources 102 generate new data records, the server 104 may automatically perform cross-referencing and correlation of the new data records among each other. The server 104 may automatically classify the new data records. The classification process may automatically trigger execution of the mapping algorithms as it may indicate that the new data records have arrived. The tables in the database 110 may automatically get populated with corresponding unique new data records from the data sources 102. The various tables of the database 110 may store the organized and classified data records.

The server 104 may receive a query from a valuation software application being executed on the user computing device 108. The query may include a request for a valuation report containing valuation and analysis of one or more companies. For example, the request may be regarding a valuation report of a first company. The server 104 may parse the query to determine one or more attributes associated with the first company included in the request. The one or more attributes may include a period duration, a period end date, sales, depreciation, interest expense, and operating income. The server 104 may retrieve the data records relevant to information within the query and based on the one or more attributes associated with the first company. For instance, the server 104 may query a first table of the database 110 to receive one or more data records associated with the first company. One data record associated with the first company may include a description about products and services offered by the first company. Another data record associated with the first company may further include a number of employees, total sales, total revenue, and total profit of the first company. Yet, another data record associated with the first company may further include a table of customers of the first company.

The server 104 may execute a predetermined protocol that uses a predetermined algorithm with retrieved data records as an input to generate the valuation report. The predetermined algorithm may be an artificial intelligence model. The artificial intelligence model may be a neural network based model, a fuzzy logic model, a linear system model, a random forest regression model, a decision tree model, or a generalized additive model. The valuation report may include on one or more values associated with the valuation of the first company.

The values in the valuation report may not be static values because the server 104 may dynamically update the values in real-time. The server 104 may iteratively and dynamically update the values in the valuation report based on a change of the data records in the first table of the database 110. For instance, the server 104 may update the values in the valuation report when new data sources 102 are added or updated as the new data sources 102 may transmit new information associated with the request in the first table of the database 110. The server 104 may continuously update the values in the valuation report by iteratively querying different conditions affecting the values and recalculating the values. Also, the server 104 may dynamically update an interactive graphical user interface of a user computing device 108, which is viewed by the user to reflect the latest values in the valuation report presented on the interactive graphical user interface.

A user computing device 108 is a computing device including a processing unit. The processing unit may execute a valuation software application or a web browser application that accesses or receives data records from the database 110. The processing unit may include a processor with computer-readable medium, such as a random access memory coupled to the processor. The user computing device 108 may be running algorithms or computer executable program instructions, which may be executed by a single processor or multiple processors in a distributed configuration. The user computing device 108 may interact with one or more software modules of a same or a different type operating within the system 100.

Non-limiting examples of the processor may include a microprocessor, an application specific integrated circuit, and a field programmable object array, among others. Non-limiting examples of the user computing device 108 may include a server computer, a workstation computer, a tablet device, and a mobile device (e.g., smartphone, PDA). The user computing device 108 may be operated by a user. The user may be a client of the financial company. For ease of explanation, FIG. 1 show a single computing device functioning as the user computing device 108. However, some embodiments may include a plurality of computing devices capable of performing the tasks described herein.

The user computing device 108 may transmit credentials of the user received via user inputs to the webserver 106, from which the webserver 106 may authenticate the user. The user computing device 108 may include a number of input devices (e.g., mouse, keyboard, touchscreen, stylus) to receive the user inputs, including various types of data inputs allowing for authentication, e.g., username, passwords, certificates, biometrics.

The user computing device 108 may include an interactive graphical user interface on which the user may interact by means of an input device, such as a touch screen, a mouse, a keyboard, a keypad, and others. The interactive graphical user interface may collect data records from the database 110, and receive and/or feed information to the user. For example, the user computing device 108 may provide the interactive graphical user interface to the user to interact with the valuation software application running on the user computing device 108. In some cases, the user computing device 108 may provide the interactive graphical user interface to the user to interact with a customer-centric valuation website hosted by the webserver 106 and presented on the user computing device 108. The user computing device 108 may execute an Internet browser or a local software application, which may access the webserver 106 in order to issue requests or instructions to the server 104 to access or query the data records from the database 110.

The user computing device 108 may execute a client-side valuation software application running on an operating system of the user computing device 108 for receiving and manipulating the data records stored in the database 110. The valuation software application may display interactive icons or buttons on the interactive graphical user interface. The multiple icons may include a first icon associated with a company search feature, a second icon associated with a competitor search feature, a third icon associated with a total range selector, a fourth icon associated with duration selector, among others.

The triggering of the icons (for example, the first icon or the second icon) may generate a screen having a plurality of portions on the interactive graphical user interface of the user computing device 108. A first portion of the screen may present a questionnaire having various questions related to a topic associated with the icons. A second portion of the screen may provide a brief text box (for example, a text box with a pre-defined number of characters) having an expandable text capture capability to capture the user's explanation of the request. The text box may include pre-filled selections identifying common requests for the user to drag and select. The text box may include pre-filled request selections with the processor moving the most likely requests to a top of a list of options based on the analysis of the previous requests by the user. The processor may continually learn and assess using information associated with the previous requests of the user. The user computing device 108 may be used by the user to upload machine-readable computer files (e.g., PDF, DOC, XSL) containing user information or the request. The computer files may be stored into document records in a local memory associated with the user computing device 108.

The user may use the interactive icons or buttons on the interactive graphical user interface of the user computing device 108 to submit a request and additional information associated with request via the valuation software application. The user computing device 108 may then issue queries or instructions to the server 104 via webpages of the valuation software application generated by the webserver 106, which may instruct the server 104 to perform various tasks based on the request. The tasks may include retrieving and processing a set of data records associated with the request from the database 110. The tasks may include a first task and a second task.

The first task may be associated with preparation of a valuation report associated with a first company. The server 104 may execute the first task and generate a first valuation report associated with the first company. The server 104 may transmit the first valuation report to the valuation software application running on the user computing device 108. The user computing device 108 may present the first valuation report on a specially designed interactive graphical user interface via the valuation software application. The user may interact with the first valuation report on the interactive graphical user interface. The first valuation report may be dynamic such that value of each variable within the first valuation report may be updated in the real-time.

The second task may be associated with preparation of one or more valuation reports associated with one or more competitor companies of a first company. The server 104 may execute the second task to identify a plurality of competitor companies from the database 110, which are related to the first company based on a category associated with the first company and description associated with the first company. The server 104 may rank the plurality of competitor companies based on a similarity of relationship between their description and the description associated with the first company. The server 104 may select the one or more competitor companies from the plurality of competitor companies based on their corresponding rank. The server 104 may generate the one or more valuation reports associated with the one or more competitor companies. The server 104 may transmit the one or more valuation reports to the valuation software application running on the user computing device 108. The user computing device 108 may present the one or more valuation reports on a specially designed interactive graphical user interface via the valuation software application. The user may interact with the one or more valuation reports on the interactive graphical user interface. The one or more valuation reports may be dynamic such that value of each variable within the one or more valuation reports may be updated in the real-time.

In one non-limiting example, the user may use a tablet computing device to access the valuation software application and generate a query to access valuation data associated with a set of companies in a first city. The server 104 may parse the query and quickly retrieve organized, summarized, consolidated, and categorized data records associated with the query from the database 110. The data records in the database 110 may include information associated the set of companies in the first city. The set of companies in the first city may include a first company and a second company. The server 104 may analyze and process retrieved data records using one or more machine learning algorithms. The server 104 may output to the tablet computing device portions of processed data records. The server 104 may also output to the tablet computing device multiple valuation reports (for example, a first valuation report and a second valuation report) generated using the processed data records for the set of companies. The interactive user interface of the tablet computing device may display the multiple valuation reports in a format according to features of the interactive user interface of the tablet computing device and configuration of the tablet computing device. The multiple valuation reports may be presented in a side-by-side view on the interactive user interface of the tablet computing device. Using some features of the valuation software application, the user may be able to compare information in the multiple valuation reports in the side-by-side view. The user may interact with various data fields in the multiple valuation reports displayed on the interactive user interface to further reconfigure or customize information displayed within the each valuation report.

In some instances, after a period of time when a third company may be added in the set of companies in the first city, a database processor of the database 110 may transmit a notification to the server 104 regarding update in the set of companies in the first city. The server 104 may transmit the notification to the tablet computing device. The valuation software application running on the tablet computing device may present the notification. The user may use the valuation software application and generate a new query to access valuation data associated with the third company. The server 104 may parse the new query and retrieve organized, summarized, consolidated, and categorized data records associated with the query from the database 110. The data records may include information associated the third company. The server 104 may analyze and process retrieved data records using the one or more machine learning algorithms. The server 104 may output to the tablet computing device portions of processed data records. The server 104 may output to the tablet computing device a third valuation report generated using the processed data records for the third company. The interactive user interface of the tablet computing device may display the third valuation report.

A webserver 106 may be a computing device hosting a user-centric valuation website or a valuation software application accessible to the user computing device 108 via the network 112. The webserver 106 may include a processing unit and non-transitory machine-readable storage capable of executing various tasks described herein. The processing unit may include a processor with a computer-readable medium, such as a random access memory coupled to the processor. Non-limiting examples of the processor may include a microprocessor, an application specific integrated circuit, and a field programmable object array, among others. Non-limiting examples of the webserver 106 may include workstation computers, laptop computers, server computers, laptop computers, and the like. While the system 100 includes a single webserver 106, in some embodiments the user webserver 106 may include a number of computing devices operating in a distributed computing environment.

The webserver 106 may be running algorithms or computer executable program instructions, which may be executed by a single processor or multiple processors in a distributed configuration. The webserver 106 may be configured to interact with one or more software modules of a same or a different type operating within the system 100. For instance, the webserver 106 may execute software applications configured to host a user-centric valuation website (e.g., Apache®, Microsoft IIS®), which may generate and serve various webpages to the user computing device 108. The user-centric valuation website may be used to access data records stored in the database 110, analyze the data records, and generate dynamic valuation reports by consolidating and processing the data records using an artificial intelligence model. The dynamic valuation reports may include valuation information of multiple companies. The valuation information may include a value of each company.

The webserver 106 may require user authentication based upon a set of user authorization credentials (e.g., username, password, biometrics, cryptographic certificate). In such implementations, the webserver 106 may access a local memory configured to store user credentials. The webserver 106 may reference the local memory in order to determine whether a set of entered credentials purportedly authenticating the user match an appropriate set of credentials that identify and authenticate the user.

The webserver 106 may generate and serve webpages associated with the valuation software application to the user computing device 108 based upon information associated with the user and structure of the interactive graphical user interface of the user computing device 108. The information associated with the user may be defined by data fields in user records stored in the local memory. The webserver 106 may conduct an authentication of the user by executing an access directory protocol. Upon authentication, the webserver 106 may generate the webpages associated with the valuation software application on the interactive graphical user interface of the user computing device 108 and access the data records stored in the database 110 according to the user specifics defined by the user record in the local memory.

A database 110 associated with the server 104, the webserver 106, the data sources 102, and the user computing device 108 is capable of storing information in plain format and encrypted version. The information may include data records associated with various companies, data records associated with various users and clients, raw revenue data records of various companies, social media data of various companies, and structured data records of various companies. The database 110 may be in communication with a processor of the server 104, the webserver 106, the data sources 102, and the user computing device 108. The processor is capable of executing multiple commands of the system 100. The database 110 may be part of the server 104, the webserver 106, and the user computing device 108. The database 110 may be a separate component in communication with the server 104, the webserver 106, and the user computing device 108. The database 110 may have a logical construct of data files, which are stored in non-transitory machine-readable storage media, such as a hard disk or memory, controlled by software modules of a database program (e.g., SQL), and a database management system that executes the code modules (e.g., SQL scripts) for various data queries and management functions.

FIGS. 2A-2D show an interactive graphical user interface 200 of a user computing device operated by a user. The user computing device may be a portable or a non-portable device, such as a desktop computer, a laptop computer, a tablet computer, a smart phone, a smart watch, a personal digital assistant, or the like. The user computing device may include a processor, which may perform one or more operations according to one or more programming instructions. The user computing device may be capable of communicating with a server through a communications network using wired or wireless communication capabilities.

A valuation software application may be installed on the user computing device. The user computing device may have access to pre-stored web-based interfaces, such as webpages associated with the valuation software application including a number of preconfigured sub-interfaces, or containers, which are dynamically populated (e.g., widget box). For example, the webpages of the valuation software application may contain code, such as HTML or PHP, presenting a website of a number of webpages having a unique look-and-feel. One or more outputs may display webpages, which may contain additional code for containers where the container code displays a valuation software application widget.

The user computing device may require user authentication based upon a set of user authorization credentials (e.g., username, password, biometrics, cryptographic certificate) to provide access to the valuation software application on the interactive graphical user interface 200 of the user computing device. For example, the user computing device may access a local memory configured to store the user credentials, which a webserver may reference in order to determine whether a set of entered credentials purportedly authenticating the user match an appropriate set of credentials that identify and authenticate the user. Similarly, in some implementations, the webserver may generate and serve the webpages associated with the valuation software application on the interactive graphical user interface 200 of the user computing device, based upon a user profile account. The webserver may generate and serve the webpages associated with the valuation software application on the interactive graphical user interface 200 of the user computing device based upon the user membership. The user profile may be defined by data fields in user records stored in a local memory, and the webserver may conduct the authentication of the user and the user profile.

The user may access the valuation software application on the interactive graphical user interface 200 of the user computing device by a common access method, e.g., keying in a URL, selecting from search results, etc., and submit user credentials to access the valuation software application. Upon the server authenticating the user using credentials that identify the user as a valid user, the user is presented multiple webpages of the valuation software application on the interactive graphical user interface 200 of the user computing device.

A first webpage 202 of the valuation software application on the interactive graphical user interface 200 of the user computing device may display multiple selectable graphical components representing multiple attributes. For example, a first selectable graphical component 204 may correspond to a selector button for selecting a first attribute. The first attribute may be associated with total dollars raised range. The user may interact with the first selectable graphical component 204 to select a minimum dollar range and a maximum dollar range. A second selectable graphical component 206 may correspond to a button for selecting a second attribute. The second attribute may be associated with companies with missing funding amount. The user may interact with the second selectable graphical component 206 to select a remove button or a keep button. A third selectable graphical component 208 may correspond to a button for selecting a third attribute. The third attribute may be associated with a geographical region. The user may interact with the third selectable graphical component 208 to select a location.

Upon the user interaction with the first selectable graphical component 204, the second selectable graphical component 206, and the third selectable graphical component 208, a sub-interface may be generated on the first webpage 202 or a second webpage 210 may be generated. The second webpage 210 may be dynamically populated with a list of companies 212, which may satisfy each attribute selected by the user using the first selectable graphical component 204, the second selectable graphical component 206, and the third selectable graphical component 208. Additional information, such as date of founding 214, employee count 216, country code 218, and a value of each company that may satisfy each attribute selected by the user may be displayed on some portion of the second webpage 210.

A third webpage 220 of the valuation software application on the interactive graphical user interface 200 of the user computing device may display multiple selectable buttons. A first selectable button 222 may correspond to a specific icon for selecting a first feature. The first feature may be associated with user profile. The user may interact with the first selectable button 222 to filter and select user profile. A second selectable button 224 may correspond to a specific icon for selecting a second feature. The second feature may be associated with user feedback. The user may interact with the second selectable button 224 to register for receiving user feedback. A third selectable button 226 may correspond to a specific search button for performing competitor search. The user may interact with the third selectable button 226 to provide a name of an input company and receive information associated with all competitors of the input company. A fourth selectable button 228 may correspond to a specific compare button for performing comparison between multiple companies. The user may interact with the fourth selectable button 228 to provide a name of two or more companies and receive comparison information associated with the two or more companies. A fifth selectable button 230 may correspond to a specific icon associated with news feed. The user may interact with the fifth selectable button 230 to register for receiving the news feed associated a company. A sixth selectable button 232 may correspond to a specific element for target inventors. The user may interact with the sixth selectable button 232 to provide an input and receive a list of target investors.

Upon the user interaction with the sixth selectable button 232, a sub-interface may be generated on the third webpage 220 or a fourth webpage 234 may be generated. The fourth webpage 234 may be dynamically populated with a list of companies 236, which may satisfy each attribute selected by the user using the sixth selectable button 232. Additional information, such as date of founding 238, a country code 240, a short description section 242, a list of funding rounds 244, and a last funding date 246 may be displayed on some portion of the fourth webpage 234.

Upon the user interaction with the fifth selectable button 230, a sub-interface is generated on the third webpage 220 or a new webpage is generated. A user may access the new webpage to generate and submit bulletins requests for receiving information associated with one or more companies. The user may receive newsletters and valuation reports associated with the one or more companies in response to the bulletins requests. In one embodiment, the server operating the valuation software application may present the newsletters and the valuation reports associated with the one or more companies on the graphical user interface 200 in response to the bulletins requests. The user may interact with the newsletters and the valuation reports associated with the one or more companies presented on the new webpage of the valuation software application on the graphical user interface 200. In another embodiment, the user may receive a web link of the newsletters and the valuation reports associated with the one or more companies in response to the bulletins requests via an electronic mail. The user may interact with the web link of the newsletters and the valuation reports associated with the one or more companies to view and read the newsletters and the valuation reports.

The interactive graphical user interfaces displayed by a server are not limited to the embodiments described herein. Some embodiments described herein describe a graphical user interface presenting webpages having top and bottom portions. However, in other embodiments the server may generate three or more portions where each portion is dynamically populated. Furthermore, instead of top or bottom portions, the server may use any other configuration (e.g., top half, bottom half, left and side sides, top ⅓ middle ⅓, and/or bottom ⅓). Furthermore, the user may customize a number of screen portions and/or sub-interfaces to be displayed on each webpage. Therefore, the user may desire to have multiple sub-interfaces within a bottom portion and only one sub-interface within the top portion.

FIG. 3 shows execution steps of displaying a dynamic valuation report on an interactive graphical user interface, according to a method 300. The method 300 shown in FIG. 3 may include execution steps 302, 304, 306, 308, 310, and 312. However, it should be appreciated that other embodiments may include additional or alternative execution steps, or may omit one or more steps altogether. It should also be appreciated that other embodiments may perform certain execution steps in a different order; steps may also be performed simultaneously or near-simultaneously with one another. In addition, the method 300 of the FIG. 3 is described as being executed by a server computer in this embodiment. The server computer executing one or more steps may be programmed to execute various other, unrelated essential features. The steps may also be executed by a plurality of server computing devices operating in a distributed computing environment.

In a first step 302, a server may execute statistical tools and artificial intelligence techniques to generate an artificial intelligence model. The server may train the artificial intelligence model using training dataset. The training dataset may include specifications of various data records and historical data associated with a first set of entities (for example, a first set of companies). The server may receive the data records and the historical data associated with the first set of entities from data sources. The server may parse the data sources to retrieve the data records and the historical data associated with the first set of entities.

The data records and the historical data may include attributes and values of each of the first set of entities. The attributes of each of the first set of entities may include name of entities, location of entities, sales records of entities, assets of entities, employee records of entities, expense records of entities, etc. The value of each of the first set of entities may include information associated with worth of each of the first set of entities. The server may continuously re-train the artificial intelligence model based on updated data records and historical data associated with the first set of entities.

The artificial intelligence model may include multiple network nodes. Each network node may be a data point, which may represent at least one attribute of the historical data. The artificial intelligence model may further represent a mathematical model or a computational model having mathematical functions. The mathematical functions may describe a relationship between each data point using weight and bias factors. The mathematical function may describe how different data points represented by different nodes and data points are interconnected.

In a next step 304, a server may periodically monitor electronic interactions between a user and an interactive graphical user interface. The user may operate a user computing device having the interactive graphical user interface. A valuation software application may be installed on the user computing device. The interactive graphical user interface may display webpages associated with the valuation software application.

The user computing device may execute the valuation software application to generate a request. The request may be to generate a valuation report for a particular set of entities or companies. The server may capture the electronic interactions on the valuation software application. The electronic interactions may include information associated with the request. The server may process and parse the request to retrieve attributes associated with the particular set of entities, for example, a second set of entities. The request may further include information associated with the user. The information associated with the user may include a profile of the user. The profile of the user may include a list of previous requests of the users and a list of accounts of the user.

In a next step 306, a server may display the interactive graphical user interface on the user computing device via the valuation software application running on the user computing device. The interactive graphical user interface may present a webpage associated with the valuation software application. The webpage may present various selectable graphical components. For instance, the webpage may present a first selectable graphical component. The first selectable graphical component may correspond to a selector button for selecting a minimum threshold value and a maximum threshold value of a first attribute. The first attribute may be total funding information. The webpage may further present a second selectable graphical component. The second selectable graphical component may correspond to a button to select a second attribute threshold. The second attribute may be a number of funding rounds.

In a next step 308, the user computing device may interact with the first selectable graphical component to select the minimum threshold value and the maximum threshold value of the first attribute. The user computing device may further interact with the second selectable graphical component to select a threshold value of the second attribute. In response to the user computing device interacting with the first and the second selectable graphical components, a server may dynamically populate a sub-interface on the webpage with a subset of the second set of entities having the first attribute within the minimum attribute value and the maximum threshold value and satisfying the second attribute threshold.

The server may execute a ranking algorithm to rank each entity within the subset of the second set of entities based on a predetermined criteria. The predetermined criteria may be an age of the entity. The server may rank each entity within the subset of the second set of entities and displays the subset of the second set of entities on the on the webpage in accordance with the ranking.

In a next step 310, a server may execute the artificial intelligence model based on information associated with the request provided by the user computing device. The server may use all or portion of the information associated with the request provided by the user computing device as inputs to the artificial intelligence model. For instance, the server may execute the artificial intelligence model using the set of attributes of each entity within the subset of the second set of entities to calculate a value of each entity within the subset of the second set of entities. The set of attributes may include sales records of entities, assets of entities, employee records of entities, expense records of entities, etc. The server may execute the artificial intelligence model to generate a valuation report for each of the subset of the second set of entities. The valuation report may include a value of each of the subset of the second set of entities.

In a next step 312, a server may transmit information associated with the valuation report for each of the subset of the second set of entities to the user computing device. The interactive graphical user interface of the user computing device via the valuation software application running on the user computing device may display the information contained in the valuation report for each of the subset of the second set of entities. The interactive graphical user interface may display the information contained in the valuation report in a format based on the configuration of the interactive graphical user interface. The interactive graphical user interface may present the information contained in the valuation report in the format based on content of the valuation report and the configuration of the interactive graphical user interface.

When the valuation report for each of the subset of the second set of entities is transmitted to the interactive graphical user interface via the valuation software application running on the user computing device, the server may dynamically populate an indicator for each entity within the subset of the second entities presented on the interactive graphical user interface. The indicator may correspond to the value of each entity. Furthermore, the server may execute a ranking algorithm to rank each entity within the subset of the second set of entities based on the value of each entity. The server ranks each entity within the subset of the second set of entities and displays the subset of the second set of entities on the interactive graphical user interface in accordance with the ranking.

The user may interact with selectable graphical components, such as the first or the second graphical component using an input device, eye movement, and head movement. Based on the interaction, the user may also be able to submit modifying instructions to modify attributes. The server may receive the modifying instructions and execute the artificial intelligence model using the new attributes. The artificial intelligence model may generate a new valuation report. In order to present information contained in the new valuation report on the interactive graphical user interface of the user computing device, the server may dynamically update the sub-interface and the indicator for each entity within the subset of the second set of entities based on the information contained in the new valuation report.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the methods and embodiments described herein. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A server-implemented method comprising:
retrieving, by a server, attributes associated with a set of entities;
displaying, by the server, a graphical user interface having a first selectable graphical component corresponding to a minimum threshold value and a maximum threshold value of a first attribute and a second selectable graphical component corresponding to a threshold value of a second attribute;
in response to a user interacting with the first selectable graphical component and the second selectable graphical component:
dynamically populating, by the server, a sub-interface of the graphical user interface with a subset list of the set of entities having the first attribute within the minimum threshold value and the maximum threshold value and satisfying the threshold value of the second attribute;
iteratively executing, by the server, an artificial intelligence model, trained by analyzing at least the first attribute and the second attribute of each entity within the subset list of the set of entities, to generate a valuation report of each entity within the subset list of the set of entities;
iteratively re-training, by the server, the artificial intelligence model using at least the valuation report of each entity within the subset list of the set of entities to improve server run-time; and dynamically populating, by the server, an indicator for each entity within the subset list of the set of entities to update the sub-interface, wherein the indicator corresponds to the valuation report of each entity within the subset list of the set of entities;

displaying, by the server, the sub-interface having a third selectable graphical component corresponding to a target investor element; and in response to the user interacting with the third selectable graphical component:

generating, by the server, a second sub-interface of the sub-interface; and dynamically populating, by the server, the second sub-interface with a second subset list of the subset list corresponding to an input received via the third selectable graphical component.

2. The server-implemented method according to claim 1, further comprising receiving, by the server, historical data associated with the set of entities from one or more data sources.

3. The server-implemented method according to claim 2, further comprising parsing, by the server, the one or more data sources to retrieve the historical data associated with the set of entities.

4. The server-implemented method according to claim 1, further comprising executing, by the server, a ranking algorithm to rank each entity within the subset list of the set of entities.

5. The server-implemented method according to claim 1, wherein the artificial intelligence model is a neural network based model.

6. The server-implemented method according to claim 1, wherein the artificial intelligence model is a fuzzy logic model.

7. The server-implemented method according to claim 1, wherein the artificial intelligence model is a linear system model.

8. The server-implemented method according to claim 1, wherein the artificial intelligence model is a random forest regression model.

9. The server-implemented method according to claim 1, wherein the artificial intelligence model is a decision tree model.

10. The server-implemented method according to claim 1, wherein the artificial intelligence model is a generalized additive model.

11. A system comprising:

a server comprising a processor and a non-transitory computer-readable medium containing instructions that when executed by the processor causes the processor to perform operations comprising:

retrieve attributes associated with a set of entities;

display a graphical user interface having a first selectable graphical component corresponding to a minimum threshold value and a maximum threshold value of a first attribute and a second selectable graphical component corresponding to a threshold value of second attribute;

in response to a user interacting with the first selectable graphical component and the second selectable graphical component:

dynamically populate a sub-interface of the graphical user interface with a subset list of the set of entities having the first attribute within the minimum threshold value and the maximum threshold value and satisfying the threshold value of the second attribute;

iteratively execute an artificial intelligence model, trained by analyzing at least the first attribute and the second attribute of each entity within the subset list of the set of entities to generate a valuation report of each entity within the subset list of the set of entities;

iteratively re-train the artificial intelligence model using at least the valuation report of each entity within the subset list of the set of entities to improve server run-time; and dynamically populate an indicator for each entity within the subset list of the set of entities to update the sub-interface, wherein the indicator corresponds to the valuation report of each entity within the subset list of the set of entities;

display the sub-interface having a third selectable graphical component corresponding to a target investor element; and in response to the user interacting with the third selectable graphical component:

generate a second sub-interface of the sub-interface; and dynamically populate the second sub-interface with a second subset list of the subset list corresponding to an input received via the third selectable graphical component.

12. The system according to claim 11, wherein the instructions further cause the processor to:

receive historical data associated with the set of entities from one or more data sources.

13. The system according to claim 12, wherein the instructions further cause the processor to:

parse the one or more data sources to retrieve the historical data associated with the set of entities.

14. The system according to claim 11, wherein the instructions further cause the processor to:

execute a ranking algorithm to rank each entity within the subset list of the set of entities.

15. The system according to claim 11, wherein the artificial intelligence model is a neural network based model.

16. The system according to claim 11, wherein the artificial intelligence model utilizes a fuzzy logic model.

17. The system according to claim 11, wherein the artificial intelligence model is a linear system model.

18. The system according to claim 11, wherein the artificial intelligence model is a random forest regression model.

19. The system according to claim 11, wherein the artificial intelligence model is a decision tree model.

20. The system according to claim 11, wherein the artificial intelligence model is a generalized additive model.

* * * * *